US011073412B2

(12) United States Patent
Taurel et al.

(10) Patent No.: US 11,073,412 B2
(45) Date of Patent: Jul. 27, 2021

(54) SUBWAVELENGTH WAVEGUIDE OPTO-MECHANICAL RESONATOR

(71) Applicant: COMMISSARIAT A L'ENERGIE ATOMIQUE ET AUX ENERGIES ALTERNATIVES, Paris (FR)

(72) Inventors: Boris Taurel, Grenoble (FR); Laurent Duraffourg, Grenoble (FR); Pierre Labeye, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 16/664,418

(22) Filed: Oct. 25, 2019

(65) Prior Publication Data

US 2020/0182659 A1 Jun. 11, 2020

(30) Foreign Application Priority Data

Oct. 26, 2018 (FR) ...................................... 18 59905

(51) Int. Cl.
  *G02B 6/00* (2006.01)
  *G01D 5/26* (2006.01)
  *G02B 6/12* (2006.01)

(52) U.S. Cl.
  CPC .......... *G01D 5/268* (2013.01); *G02B 6/12007* (2013.01); *G02B 2006/12138* (2013.01)

(58) Field of Classification Search
  CPC ............ G02B 2006/12138; G02B 6/12; G02B 6/12007; G02B 6/00
  See application file for complete search history.

(56) References Cited

U.S. PATENT DOCUMENTS

| 6,571,028 | B1* | 5/2003 | LoCascio ............... B82Y 10/00 |
| | | | 359/244 |
| 10,031,158 | B1 | 7/2018 | Douglas et al. |
| 2008/0019409 | A1* | 1/2008 | Garrigues ................ G01J 3/26 |
| | | | 372/45.01 |
| 2019/0011261 | A1 | 1/2019 | Taurel et al. |
| 2019/0155065 | A1* | 5/2019 | Taurel .................... G01D 5/266 |

FOREIGN PATENT DOCUMENTS

FR 3 068 778 A1 1/2019

OTHER PUBLICATIONS

French Preliminary Search Report dated Jul. 9, 2019 in French Application 18 59905 filed on Oct. 26, 2018 (with English Translation of Categories of Cited Documents).

(Continued)

*Primary Examiner* — Jennifer Doan
(74) *Attorney, Agent, or Firm* — Oblon, McClelland, Maier & Neustadt, L.L.P.

(57) ABSTRACT

An opto-mechanical resonator including a waveguide formed by a plurality of first strips spaced apart from one another; and two mirrors disposed facing one another, which mirrors are optically reflective over at least part of a guide wavelength range of the waveguide. The waveguide extends between the two mirrors, and forms therewith an optically resonant cavity. At least part of the waveguide is held such that it is suspended over a substrate by at least one deformable mechanical element.

12 Claims, 4 Drawing Sheets

(56) References Cited

OTHER PUBLICATIONS

Nathan C. Lindquist, et al., "Periodic Modulation of Extraordinary Optical Transmission through Subwavelength Hole Arrays using Surrounding Bragg Mirrors", arxiv.org, Cornell University Library, 201 Olin Library Cornell University Ithaca, NY 14853, Aug. 9, 2007, XP080297900, 9 pages.

Jasper Chan, et al., "Laser cooling of a nanomechanical oscillator into its quantum ground state", arxiv.org, Cornell University Library, 201 Olin Library Cornell University Ithaca, NY 14853, Jun. 18, 2011, XP080509973, 18 pages.

Amir H. Safavi-Naeini, et al., "Observation of Quantum Motion of a Nanomechanical Resonator", Physical Review Letters, vol. 108, Jan. 17, 2012, XP002792738, 5 pages.

B. Dong, et al., "An On-Chip Opto-Mechanical Accelerometer", Electro Mechanical Systems (MEMS), 2013 IEEE 26th International Conference on, IEEE, Jan. 20, 2013, XP032339318, pp. 641-644.

\* cited by examiner

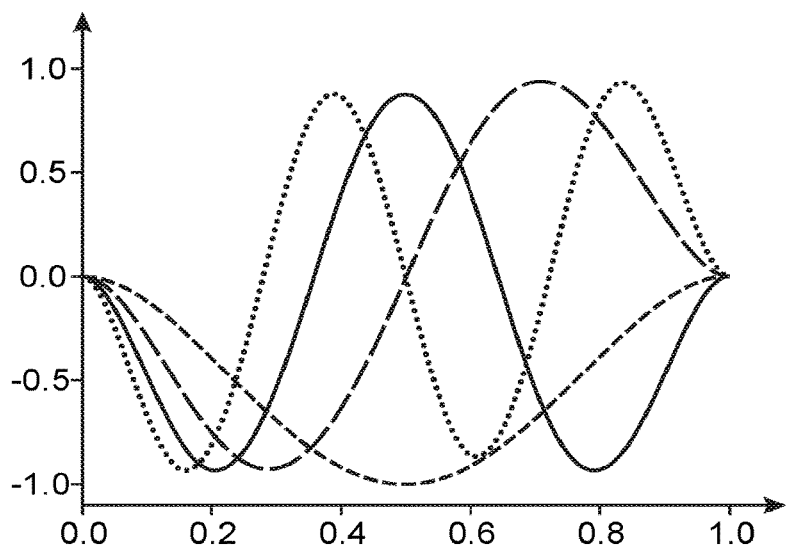
FIG.2
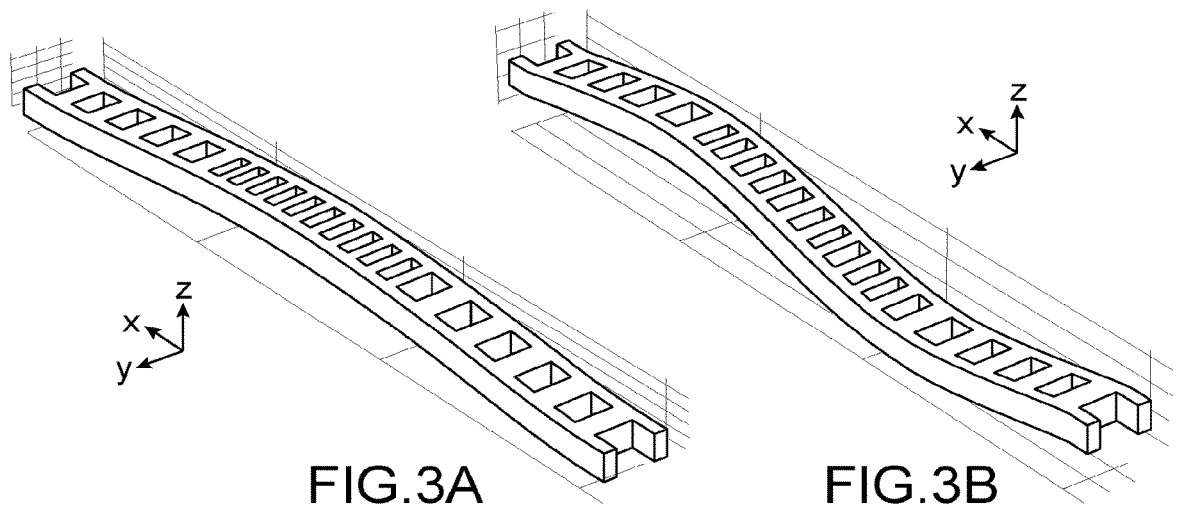
FIG.3A
FIG.3B
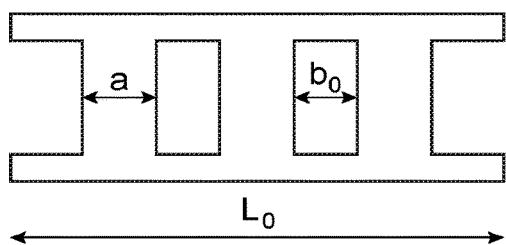
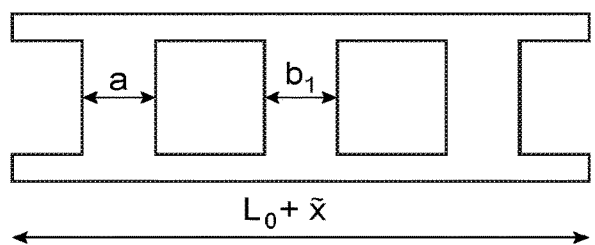
FIG.4A
FIG.4B

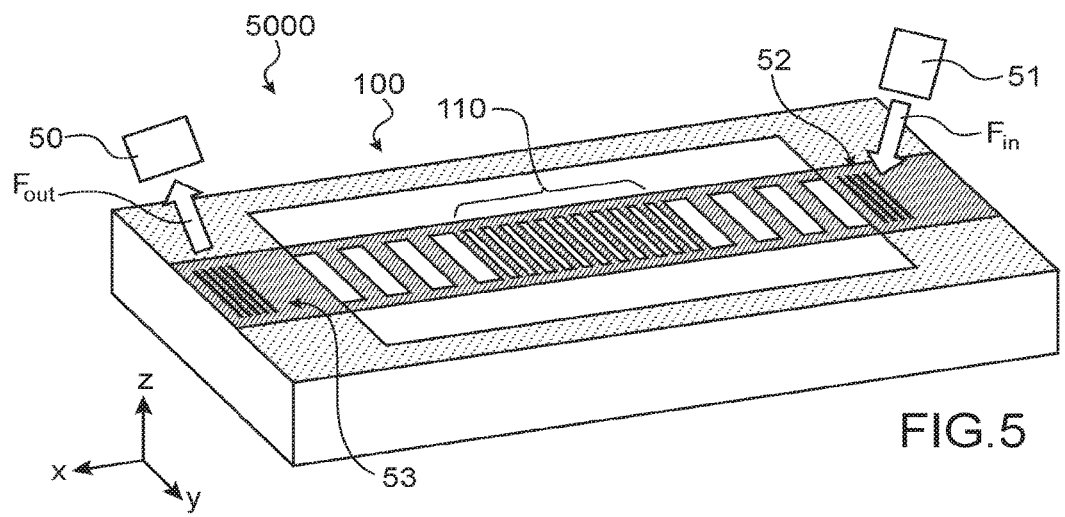
FIG.5
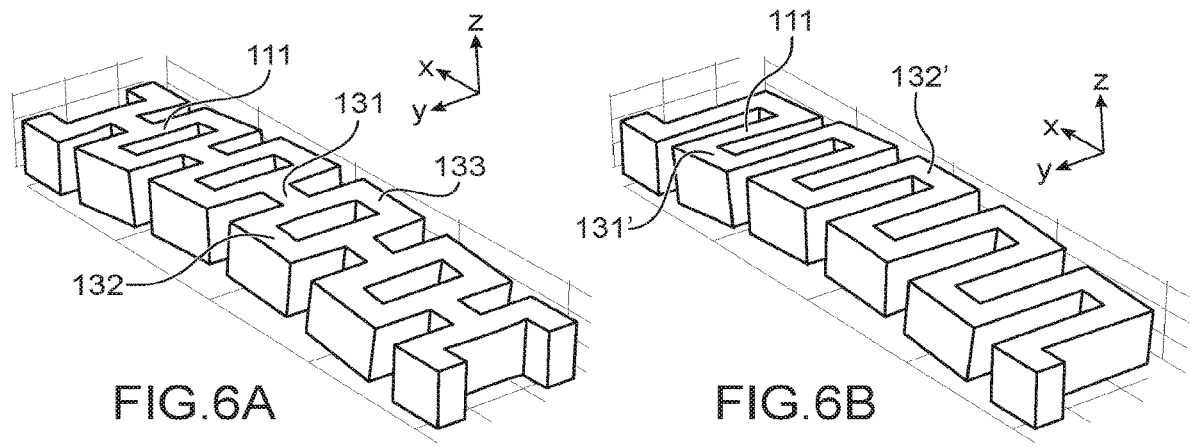
FIG.6A
FIG.6B
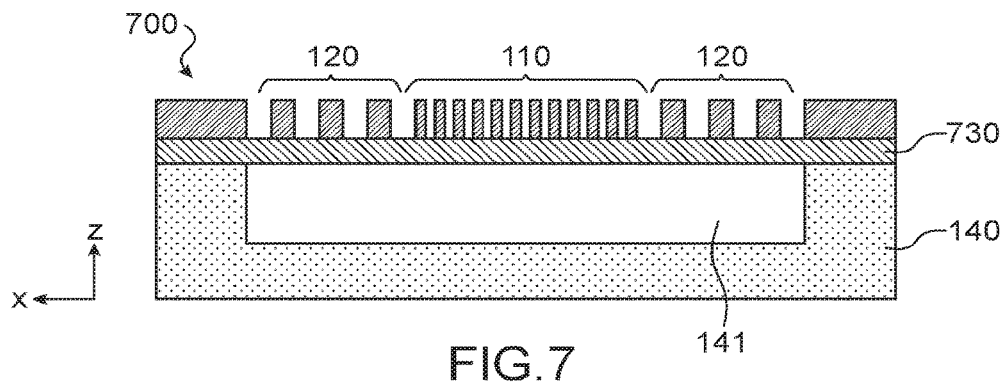
FIG.7

SUBWAVELENGTH WAVEGUIDE OPTO-MECHANICAL RESONATOR

TECHNICAL FIELD

The invention relates to the field of opto-mechanical resonators, wherein the setting of a mechanical element of the resonator in motion influences an optical signal confined in said resonator. The observation of the optical signal at the output of the resonator gives information on the mechanical movement in the resonator, as well as on the phenomenon causing this movement.

PRIOR ART

Different types of opto-mechanical resonators are known in the prior art.

Such a resonator is, for example, produced in a free space, formed by an optically resonant cavity of the Fabry-Perot type, wherein one of the mirrors is free to undergo displacement. The displacement of the movable mirror modifies the length of the cavity, and thus the resonance wavelengths thereof. The observation of an optical signal emerging from the cavity allows information to be obtained regarding the resonance wavelength of the cavity, which depends on the position of the movable mirror.

However, such a resonator remains too sensitive to the conditions of the experiment in order to allow exploitation outside of the research scope.

In order to overcome this drawback, downscaled opto-mechanical resonators with on-chip integration have been developed. These are referred to as micro-"ring" resonators, wherein the optical signal is guided along a ring-shaped optical path. The micro-resonator is arranged such that it is suspended over a substrate and capable of undergoing deformation in response to external stresses. The deformation of the micro-resonator modifies the resonance wavelength thereof. The analysis of a light beam emerging from the micro-resonator thus allows information to be obtained regarding this deformation. Patent application FR 17 56293 describes the specific case of a micro-ring resonator formed by a plurality of segments spaced apart from one another, jointly forming a subwavelength waveguide. This arrangement of segments separated from one another allows the sensitivity of the micro-resonator to be increased.

One purpose of the present invention is to propose an opto-mechanical resonator having a coupling rate that is even better than that of the opto-mechanical resonators of the prior art.

DESCRIPTION OF THE INVENTION

This purpose is achieved by an opto-mechanical resonator comprising a waveguide formed by a plurality of first strips spaced apart from one another, and wherein:
- the opto-mechanical resonator comprises at least two mirrors disposed facing one another, which mirrors are optically reflective over at least part of a guide wavelength range of the waveguide;
- the waveguide extends between the two mirrors, and forms therewith an optically resonant cavity; and
- a so-called suspended region, comprising at least part of the waveguide, is held such that it is suspended over a substrate by at least one deformable mechanical element.

The at least one deformable mechanical element is capable of undergoing deformation in response to an external stress, while driving the suspended region therewith. The deformation of the suspended region influences an optical signal confined in the optically resonant cavity, undergoing a plurality of forward-return movements in the waveguide and passing via said suspended region. The invention thus allows an opto-mechanical coupling to be produced between a mechanical displacement in the resonator and a physical property of an optical signal having transited therein. The opto-mechanical coupling is in particular based on an effective index variation of the waveguide in the suspended region, when the latter undergoes deformation.

The opto-mechanical resonator is integrated onto the substrate, which gives it high stability, in particular in terms of alignment, compared to the opto-mechanical resonators of the prior art formed in a free space.

Moreover, it can be shown that the coupling rates obtained in the opto-mechanical resonator according to the invention are greater than those capable of being obtained in the opto-mechanical resonators of the prior art, even those with on-chip integration. The coupling rates obtained overcome the need for the very strict conditions of use conventionally imposed in the prior art (clean room and/or cryogenic temperature).

Preferably, the deformable mechanical element is fixed relative to the substrate, at least at one of the ends thereof along an axis parallel to the waveguide.

The at least one deformable mechanical element can comprise at least one arm, which extends along at least one axis parallel to the waveguide. In particular, the at least one deformable mechanical element can comprise two arms, laterally framing the suspended region.

Alternatively, the at least one deformable mechanical element can comprise at least two series of segments, and, in each series, the segments are distributed along an axis parallel to the waveguide and separated, in pairs, at least by a gap filled with a gas or a vacuum.

According to another alternative embodiment, the at least one deformable mechanical element can comprise a deformable membrane forming a support for the suspended region.

The different alternative embodiments can be combined with one another.

Preferably, said mirrors are Bragg mirrors. Each of said Bragg mirrors advantageously comprises a plurality of second strips, each of which is made of the same material as the first strips of the waveguide. At least part of at least one of said Bragg mirrors can form a part of the suspended region.

Advantageously, the first strips of the waveguide are distributed one after another according to a distribution pitch $\Lambda$ such that:

$$\Lambda < \frac{\lambda_0}{2n_h}$$

where $\lambda_0$ is the central wavelength of the guide wavelength range of the waveguide; and $n_h$ is the average refractive index of the first strips.

The invention further relates to a system including at least two opto-mechanical resonators, wherein:
- each opto-mechanical resonator comprises an optically resonant cavity, formed by a waveguide arranged between two mirrors, with the waveguide comprising a plurality of first strips spaced apart from one another;
- at least one of said opto-mechanical resonators forms an opto-mechanical resonator according to the invention; and the opto-mechanical resonators are optically coupled in pairs by evanescent coupling.

The invention further relates to a measuring device including at least one opto-mechanical resonator according to the invention and at least one optical sensor, the optical sensor being arranged so as to receive a light beam emerging from the opto-mechanical resonator after having undergone a plurality of forward-return movements therein, and being capable of measuring a fluctuation, as a function of time, of a physical property of said light beam.

BRIEF DESCRIPTION OF THE FIGURES

The present invention will be better understood after reading the following description of example embodiments, given for purposes of illustration only and not intended to limit the scope of the invention, and with reference to the accompanying figures, wherein:

FIGS. 2, 3A and 3B show different mechanical resonance modes in the opto-mechanical resonator in FIG. 1A to 1C;

FIGS. 4A and 4B diagrammatically show the opto-mechanical coupling implemented in an opto-mechanical resonator according to the invention;

FIG. 5 diagrammatically shows a measuring device including the opto-mechanical resonator in FIG. 1A to 1C;

FIGS. 6A and 6B diagrammatically show, by way of detailed views, two alternative embodiments of the opto-mechanical resonator in FIG. 1A to 1C;

FIG. 7 to 9 respectively show second, third and fourth embodiments of an opto-mechanical resonator according to the invention.

DETAILED DESCRIPTION OF SPECIFIC EMBODIMENTS

Figure 1A:
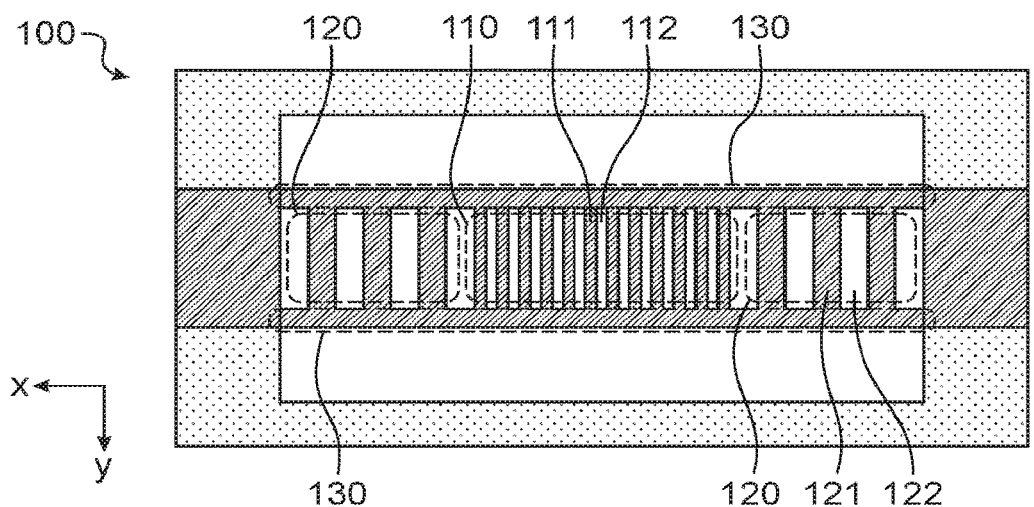
FIG. 1A to 1C diagrammatically show, according to different views, a first embodiment of an opto-mechanical resonator according to the invention.
Figure 1B:
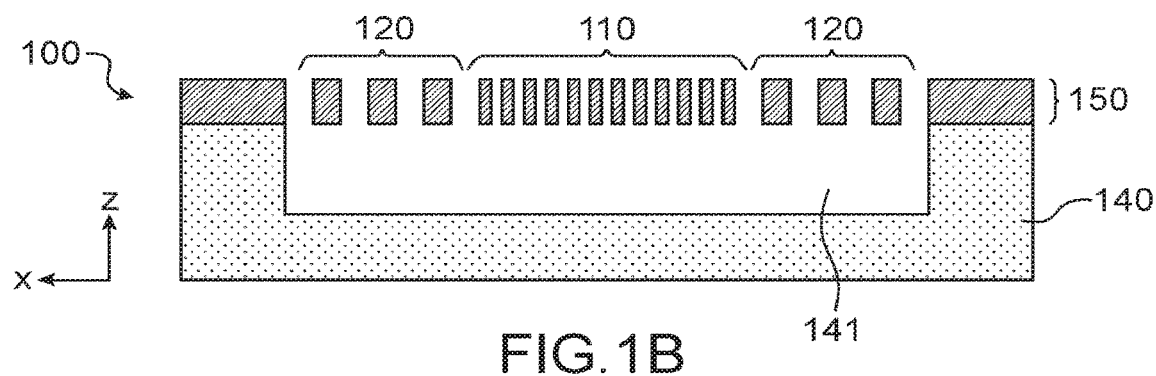
Figure 1C:
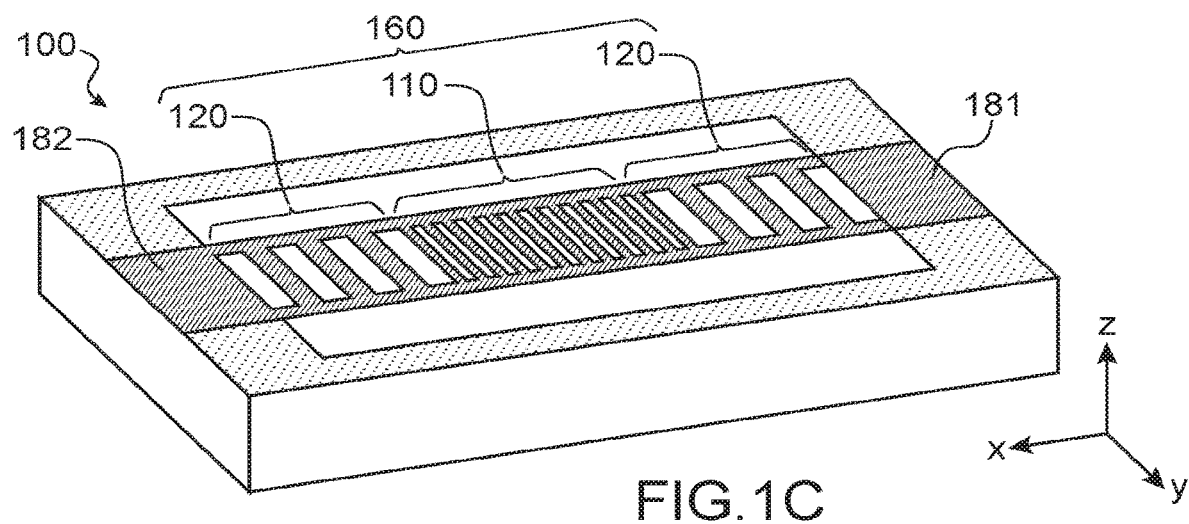

With reference to FIG. 1A to 1C, a first embodiment of an opto-mechanical resonator 100 according to the invention is described. In FIG. 1A to 1C, the opto-mechanical resonator 100 is respectively shown via an overhead view in the plane (xOy) of an orthonormal frame of reference, via a sectional view in the plane (xOz) of the same frame of reference, and via a perspective view.

The opto-mechanical resonator 100 includes:
  a subwavelength waveguide 110;
  two Bragg mirrors 120; and
  two support arms 130, laterally framing the waveguide 110 and the Bragg mirrors 120.

The waveguide 110 and the Bragg mirrors 120 are arranged such that they are suspended over a substrate 140 via the support arms 130. The waveguide 110, the Bragg mirrors 120 and the support arms are surrounded by a surrounding medium formed by a gas or a vacuum. FIG. 1B is a sectional view of the opto-mechanical resonator 100, in a plane (xOz) passing through the waveguide 110. FIG. 1B in particular shows a cavity 141 formed in the substrate 140. The waveguide 110, the Bragg mirrors 120 and the support arms are suspended over the cavity 141.

The term "at rest" employed herein denotes a situation in the absence of any external mechanical stress on the opto-mechanical resonator 100.

The waveguide 110 is capable of guiding a light beam at a wavelength that lies in a wavelength range, referred to as a guide wavelength range of the waveguide. Said wavelength range is centred at a wavelength $\lambda_0$. The waveguide 110 is configured such that it guides a light beam along a linear optical path. In the absence of any external mechanical stress, this optical path is rectilinear and extends along an axis parallel to the axis (Ox).

The waveguide 110 is a so-called subwavelength waveguide, or SWG (SubWavelength Grating). It is formed by first strips 111 spaced apart from one another and distributed one after the other along the axis (Ox). Each first strip 111 has a rectangular parallelepiped shape. In this case, all of the first strips 111 are made of the same material, for example silicon. They are separated, in pairs, by free spaces 112 filled with a gas or a vacuum.

In the absence of any external mechanical stress, the strips 111 are distributed according to a regular pitch $\Lambda$ along the axis (Ox), where $\Lambda$ is significantly less than $\lambda_0$. On this scale, light can only be sensed at an average refractive index between the index of the strips 111 and the index of the free spaces 112 between the strips 111, and is not diffracted. In other words, the waveguide 110 acts as a material of average refractive index:

$$n_{average} = \sqrt{\frac{l}{\Lambda}n_h^2 + \frac{\Lambda-l}{\Lambda}n_b^2} \qquad (1)$$

where:
l is the length of a strip 111, along the axis (Ox);
$\Lambda$ is the distribution pitch of the strips 111;
$n_h$ is the average refractive index in a strip 111; and
$n_b$ is the average refractive index in a free space 112, between two strips 111.

Preferably, the pitch $\Lambda$ in particular satisfies the following equation:

$$\Lambda < \frac{\lambda_0}{2n_{average}} \qquad (2)$$

where $\lambda_0$ is the central wavelength of a wavelength range that the waveguide 110 is capable of guiding.

Advantageously, we even have:

$$\Lambda < \frac{\lambda_0}{2n_h} \qquad (3)$$

where $n_h$ is the average refractive index in a strip 111.

In practice, the distribution pitch $\Lambda$ is advantageously less than 3 µm, and even less than 2 µm, or 1 µm.

It should be noted that the term "waveguide" here is used somewhat imprecisely to refer to the waveguide core, whereby the cladding is formed by the surrounding medium around the strips, in this case a vacuum or a gas.

The Bragg mirrors 120 are arranged on either side of the waveguide 110. They extend facing one another, in planes (yOz) and orthogonal to the axis of elongation of the waveguide 110 when at rest. A Bragg mirror is conventionally formed by a periodic arrangement of layers of optical refractive indexes n1, respectively n2. In this case, the Bragg mirrors are arranged such that they are suspended. Each Bragg mirror 120 is more particularly formed by a plurality of second strips 121 spaced apart from one another and distributed one after the other along the axis (Ox). In this case, as a result of the suspended arrangement of the mirrors, the second strips 121 are separated, in pairs, by a respective free space 122 filled with a gas or a vacuum. Each second strip 121 has a rectangular parallelepiped shape. Here, the second strips 121 are made of the same material as that of the first strips 111, in this case silicon.

Each Bragg mirror 120 is optically reflective over a wavelength range at least partially superimposed with the guide wavelength range of the waveguide 110.

The Bragg mirrors 120 define, with the waveguide 110, an optical cavity 160 that is optically resonant, wherein the light undergoes successive forward-return movements in the waveguide 110, by being alternately reflected by one then by the other of the two Bragg mirrors 120. The optical cavity 160 is a linear optical cavity which, in this respect, is similar to a Fabry-Perot type cavity, with the exception that the light does not circulate in the free space between the two mirrors. The optical cavity 160 is optically resonant at the wavelength $\lambda_r$ which lies in both the guide wavelength range of the waveguide 110 and to the wavelength range reflected by the Bragg mirrors.

The support arms 130 extend on either side of the first and second strips 111, 121. Each first strip 111 and each second strip 121 has an end that is fixed to one of the support arms 130, and the other end that is fixed to the other support arm 130. The support arms are advantageously made of the same material as the first strips 111 of the waveguide, in this case silicon. In practice, the support arms 130, the first strips 111 and the second strips 121 are advantageously formed together in one piece, etched in the same layer (see FIG. 1B as regards the layer 150 covering the substrate 140). The width of the support arms 130 (along the axis (Oy)) preferably satisfies the same condition as the pitch $\Lambda$ in the equation (3) in order to prevent optical leaks via the support arms. The width of the support arms is, for example, in the order of 0.1 m.

Each support arm 130 is held suspended over the substrate 140, with the two ends thereof being fixed relative to the substrate 140 (ends along the axis (Ox)). Between the two ends, each support arm 130 is capable of undergoing mechanical deformation in reaction to an external mechanical stress exerted, for example, by an inertial force, an acoustic wave, or a particle, etc. Each support arm 130 thus forms a deformable mechanical element.

When undergoing deformation, the support arms 130 drive therewith the first strips 111 of the waveguide 110 in addition to the second strips 121 of the Bragg mirrors 120. As a result, the deformation of the support arms 130 generates a corresponding deformation of the waveguide 110 and of the Bragg mirrors 120.

When undergoing deformation by way of the support arms 130, the waveguide 110 no longer extends in a straight line, but instead in a curved line. This line has a so-called curvilinear length that is greater than the length of the waveguide when at rest.

The deformation of the waveguide 110 also results in an increase in the length of the free spaces 112 between two first strips and/or in an increase in the length of the first strips 111, said lengths being measured along the curved line defining the shape of the waveguide 110. A ratio between the length of a first strip 111 and the length of a free space 112 is thus modified, which results in a modification of the average refractive index of the waveguide ($n_{average}$, equation (1)) and thus of the effective index seen by the light in the waveguide 110 (substantially equal to $n_{average}$).

The variation in the effective index of the waveguide 110, and the variation in the curvilinear length of the waveguide 110, both contribute to varying the values of the resonant wavelengths $\lambda_r$ of the optical cavity 160. More specifically, these different magnitudes are connected by:

$$\omega_r = 2\pi m \frac{c}{n_{eff} L} \qquad (4)$$

where m is a positive integer,
c is the celerity of the light in the vacuum,
$\omega_r$ is a resonance frequency of the optical cavity, linked to a resonance wavelength $\lambda_r$ by $$\omega_r = \frac{2\pi c}{\lambda_r},$$

$n_{eff}$ is the effective index seen by the light in the optical cavity 160, in this case equal to the effective index seen by the light in the waveguide 110, and
L is the curvilinear length of the optical cavity 160, in this case equal to the curvilinear length of the waveguide 110.

The deformation of the waveguide 110 thus ultimately results in a variation in the resonance wavelength $\lambda_r$ of the optical cavity 160. This variation in the resonance wavelength $\lambda_r$ results in an offset relative to the wavelength $\lambda_s$ of an optical signal circulating in the optical cavity 160, and thus in an attenuation of the signal at the wavelength $\lambda_s$ at the output of the cavity 160. The more the resonance wavelength $\lambda_r$ deviates from $\lambda_s$, the more the transmission of the optical signal at the wavelength $\lambda_s$ is attenuated.

Thus, a mechanical displacement in the opto-mechanical resonator 100 results in a variation in the optical signal emerging from said resonator 100 after having undergone a plurality of forward-return movements therein. The observation of the optical signal emerging from the resonator 100 thus gives information on a mechanical displacement in the resonator, and thus on the phenomenon causing this displacement. A force applied to the opto-mechanical resonator can thus be detected and, where appropriate, measured, based on a measurement on a signal having transited therein. For example, a variation in the light intensity at the wavelength $\lambda_s$ can be measured, or a variation in the resonance wavelength $\lambda_r$ (by injecting a broad-spectrum signal at the input of the resonator 100, only the portion of which signal at the resonance wavelength $\lambda_r$ will be able to be transmitted by the resonator 100).

The invention will allow better sensitivities to be obtained compared to those of the prior art, since the application of an external force on the opto-mechanical resonator varies two parameters, and not just one parameter, defining the resonance wavelength $\lambda_r$ of the optical cavity 160 (length of the cavity and effective index).

In the example shown herein, the Bragg mirrors 120 are also arranged such that they are suspended, via the support arms 130. As a result, the deformation of the support arms 130 also generates a deformation of the Bragg mirrors 120. This deformation can result in an increase of the interval between two second strips 122 and/or an increase in the length of the second strips 121. The rate of transmission and reflection of the Bragg mirrors are modified accordingly, which increases the losses in the optical cavity 160, and contributes to reducing the light intensity of a signal at the wavelength $\lambda_s$ at the output of the opto-mechanical resonator. The sensitivity of the resonator is thus increased further. Moreover, this effect can be exploited in order to reduce the quantum noise in the resonator.

In practice, a light beam can be fed into and extracted from the opto-mechanical resonator 100 by at least one ancillary waveguide, integrated into the same substrate as the resonator. In this case, the light is fed on one side by a first ancillary waveguide 181, and extracted on the other side by a second ancillary waveguide 182. In this case, each ancillary waveguide 181, 182 has a core made of the same material as the first strips of the waveguide 110, and a cladding made of the material of the substrate 140.

The support arms and the elements that they hold suspended over the substrate 140 jointly form a suspended assembly. This suspended assembly generally undergoes deformation according to an oscillating movement, which corresponds to one of the modes of mechanical vibration thereof. In this case, the suspended assembly is maintained with the substrate by the two ends of the support arms, such that the modes of mechanical vibration are those of a fixed-fixed beam. FIG. 2 shows the first four modes of mechanical vibration. The abscissa is a normalised position along the axis (Ox), the ordinate is a normalised position along the axis (Oy). The curves in FIG. 2 were also obtained for a resonator of the type shown in FIG. 1A to 1C, with a waveguide of pitch $\Lambda$=200 nm including 10 periods, and Bragg mirrors each including 5 second strips. FIGS. 3A and 3B show the waveguide 110, according to a perspective view, and at maximum deformation thereof, for the first two modes of vibration shown in FIG. 2.

The paragraphs below describe the coupling rate that can be obtained in an opto-mechanical resonator according to the invention.

FIGS. 4A and 4B diagrammatically show the deformation of the waveguide. When undergoing deformation, the waveguide passes from an initial length $L_0$ to a length $L_0+\tilde{x}$. Initially, the waveguide is formed by first strips 111 of length a separated, in pairs, by a free space of length $b_0$. The increase in length $\tilde{x}$ can be an increase in the length of the first strips 111 and/or an increase in the length of the free spaces. In practice, and as shown in FIGS. 4A and 4B, the increase in length $\tilde{x}$ is an increase in the length of the free spaces.

The opto-mechanical coupling $g_{om}$ implemented in the resonator 100 is defined by:

$$g_{om} = \frac{\partial \omega_r}{\partial \tilde{x}} \quad (5)$$

where $\tilde{x}$ is a variation in the length of the waveguide, and where $\omega_r$ is a resonance frequency of the optical cavity belonging to said resonator.

It can be seen that $g_{om}$ is in particular a function of $L(\tilde{x})$ (length of the optical cavity, as a function of $\tilde{x}$) and of $n_{eff}(\tilde{x})$ (effective index seen by the wave guided in the optical cavity, as a function of $\tilde{x}$). It is shown that, in an opto-mechanical resonator having a Fabry-Pérot cavity according to the prior art, the effective index is a constant. In this case, the use of a subwavelength waveguide in the optical cavity allows this variation in the effective index to be additionally obtained. In particular, and as shown hereinabove, the deformation of the waveguide modulates an aspect ratio between the first strips and the free spaces, which modulates the average refractive index of the core of the waveguide, and thus the effective index seen by the light circulating in the waveguide. It can thus be seen that the invention allows an opto-mechanical coupling coefficient $g_{om}$ to be obtained that is greater than those of the prior art, in particular those of opto-mechanical resonators of the prior art of the Fabry-Pérot type.

The expression of $L(\tilde{x})$, then of $$\frac{\partial L}{\partial \tilde{x}},$$

can be obtained by precise digital resolution, or using a simplified analytical model (while assuming that the variation in length $\tilde{x}$ is evenly distributed along the waveguide, and that the material of the first strips is not sensitive to the displacement).

Similarly, $n_{eff}(\tilde{x})$ then $$\frac{\partial n_{eff}}{\partial \tilde{x}}$$

can be calculated in an approximate manner using a method of reducing the effective index to two dimensions, or in a precise manner by digital resolution.

For example, the values of $g_{om}$ have been determined analytically, in the case of a waveguide formed by first silicon strips in an air bath. The first strips have a section measuring 500 nm*200 nm, and are distributed according to a pitch $\Lambda$=0.2 nm. The aspect ratio between the strips and the free spaces is equal to 0.5 (when at rest), and the length of the waveguide at rest is $L_0$=10 m (i.e. 50 periods). Each of the Bragg mirrors 120 is formed by 10 periods of 460 nm, and in this case is assumed to be non-moving and not suspended. At the wavelength $\lambda_s$=1.55 μm, the following is obtained: $g_{om}$=121.6 GHz/nm.

The same calculation is carried out by digital simulation. A plurality of simulations are carried out for different values of $\tilde{x}$. $g_{om}$ is then calculated from the position of the resonance peaks as a function of $\tilde{x}$ (see definition of $g_{om}$ in equation (5)). The value of $g_{om}$ obtained by digital simulation is of the same order of magnitude, and is consistent with that obtained by the analytical method.

Then invention is thus shown to obtain high values of $g_{om}$, which is the variation in the optical frequency transmitted by the opto-mechanical resonator as a function of the elongation of the optical cavity of said resonator. The value of $g_{om}$ defines the value of $g_o=g_{om}x_{ZPF}$, which represents the coupling rate between a single photon and a single phonon in the opto-mechanical resonator according to the invention. $x_{ZPF}$ denotes the zero point movement, i.e. the variation in the length of the waveguide associated with the ground state of the waveguide, when the energy thereof is zero. For a waveguide supported by fixed-fixed support arms, $x_{ZPF}$=87.06 fm=8.706*10$^{-14}$ m and finally $$\frac{g_o}{2\pi} = 1.685$$

MHz are in particular obtained. In any case, the invention allows high values of $g_o$ to be obtained, which values are greater, by at least one order of magnitude, than the values obtained in the various devices of the prior art.

The gain of at least one order of magnitude for the values of $g_o$ allows a signal-to-noise ratio of the opto-mechanical resonator according to the invention to be increased, and/or the experiment conditions to be less strict, in particular those regarding the operating temperature. In particular, the opto-mechanical resonator according to the invention provides high performance levels in the absence of cooling to a cryogenic temperature, and can even be operated at ambient temperature.

In addition to obtaining high values of $g_{om}$, the subwavelength waveguide reduces the non-linear effects in the opto-mechanical resonator according to the invention. A wide linear operating range is thus obtained.

FIG. 5 diagrammatically shows a measuring device 5000 including an opto-mechanical resonator 100 as described with reference to FIG. 1A to 1C, and an optical sensor 50.

During operation, a light source 51 emits a light beam $F_{in}$, preferably a monochromatic light beam centred about the wavelength $\lambda_s$. The light beam $F_{in}$ is injected into the opto-mechanical resonator 100. The light source 51 can be integrated into the substrate 140 of the opto-mechanical resonator 100. Alternatively, the light source 51 is distant from the substrate 140, and the light beam $F_{in}$ is initially brought to a first coupling grating 52 that produces an optical coupling between a photon circuit in the substrate and the outside of the substrate.

The optical sensor 50 is arranged such that it receives a light beam $F_{out}$ emerging from the opto-mechanical resonator 100 after having undertaken a plurality of forward-return movements therein. The optical sensor 50 can be integrated into the substrate 140 of the opto-mechanical resonator 100. Alternatively, the optical sensor 50 is distant from the substrate 140, and the light beam $F_{out}$ is initially brought to a second coupling grating 53 that produces an optical coupling between a photon circuit in the substrate and the outside of the substrate. In this case, the optical sensor 50 and the light source 51 are disposed at the two opposite ends of the opto-mechanical resonator 100, along the axis of elongation (Ox) of the waveguide 110.

The optical sensor 50 is capable of measuring a fluctuation, as a function of time, of a physical property of the light beam $F_{out}$. This property is preferably a light intensity at the wavelength $\lambda_s$. Alternatively, the light beam $F_{in}$ has a spectrum, the width whereof is equal to at least several nm, and the property measured by the optical sensor 50 is a wavelength of an intensity peak of the beam $F_{out}$. A variation in the resonance wavelength of the opto-mechanical resonator 100 is thus measured.

The measuring device 5000 advantageously forms an inertial sensor such as a gyrometer or an accelerometer, or any other force sensor. It can also form a photoacoustic sensor.

FIG. 1A to 1C show one embodiment of the invention, wherein the waveguide and the mirrors are held suspended by two support arms laterally framing them. FIGS. 6A and 6B show alternative embodiments wherein the waveguide and the mirrors are held suspended via at least two series of arm segments. The segments extend with the waveguide and the Bragg mirrors in the same plane parallel to the substrate. They have the same features on the support arms in terms of material and section in a plane (xOz). In each series:
- each of the segments extends between two neighbouring strips of the waveguide, respectively between two neighbouring strips of the Bragg mirrors;
- when at rest, the segments are distributed one after the other along an axis parallel to the axis of elongation (Ox) of the waveguide; and
- the segments are spaced apart from one another, separated, in pairs, by a free space between two neighbouring strips.

In FIG. 6A, the first strips 111 of the waveguide (and the second strips of the Bragg mirrors) are maintained integral with one another by way of three series of segments. In a first series, the segments 131 extend along an axis passing via the middle of the strips along the axis (Oy). In a second series, the segments 132 extend along an axis passing via one end of the strips along the axis (Oy). In a third series, the segments 133 extend along an axis passing via the other end of the strips along the axis (Oy). The strips are grouped together into groups of two strips. In each group, the two strips are connected to one another at the two respective ends thereof by a segment 132 and a segment 133. The groups of two strips are connected in pairs by a segment 131.

In FIG. 6B, the first strips 111 of the waveguide (and the second strips of the Bragg mirrors) are maintained integral with one another by way of two series of segments. In a first series, the segments 131' extend along an axis passing via one end of the strips along the axis (Oy). In a second series, the segments 132' extend along an axis passing via the other end of the strips along the axis (Oy). The strips and the segments are arranged together according to a notched pattern.

In the examples described hereinabove, the suspended arrangement is produced by way of arms or segments, the width whereof is significantly less than the width of the first strips of the waveguide. Alternatively, the suspended arrangement can be produced by way of a thin membrane forming a support for the suspended elements. One example of such an alternative is shown in FIG. 7.

The opto-mechanical resonator 700 of FIG. 7 only differs from that of FIG. 1A to 1C in that the waveguide 110 and the Bragg mirrors 120 are not arranged such that they are suspended by support arms, but by a membrane 730 which, when at rest, extends in a plane parallel to the plane (xOy), between the substrate 140 and the assembly formed by the waveguide and the Bragg mirrors. The membrane 730 is formed, for example, by a thin layer of silicon, which covers the cavity 141 formed in the substrate 140. The membrane 730 is capable of undergoing mechanical deformation in response to stressing by an external mechanical stress, for example exerted by an inertial force, an acoustic wave, or a particle, etc. The thickness of the membrane 730 is, for example, less than 200 nm.

Figure 8:
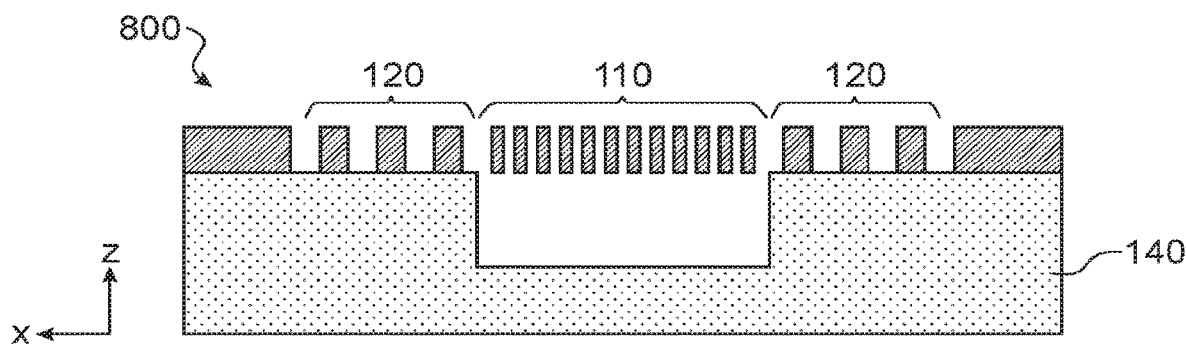

In the examples described hereinabove, the entire assembly formed by the Bragg mirrors and the waveguide is arranged such that it is suspended over the substrate. Alternatively, only part of this assembly is arranged such that it is suspended over the substrate. For example, the Bragg mirrors are not necessarily arranged such that they are suspended. One, or even both of the two Bragg mirrors can be arranged such that it (or they) are fixed relative to the substrate, over the entire length thereof or over only part of the length thereof. However, at least part of the waveguide is always arranged such that it is suspended over the substrate. One example of such an alternative is shown in FIG. 8. The opto-mechanical resonator 800 in FIG. 8 only differs from that in FIG. 1A to 1C in that only the waveguide 110 is arranged such that it is suspended over the substrate 140, the Bragg mirrors 120 being fixed relative to the substrate 140.

Figure 9:
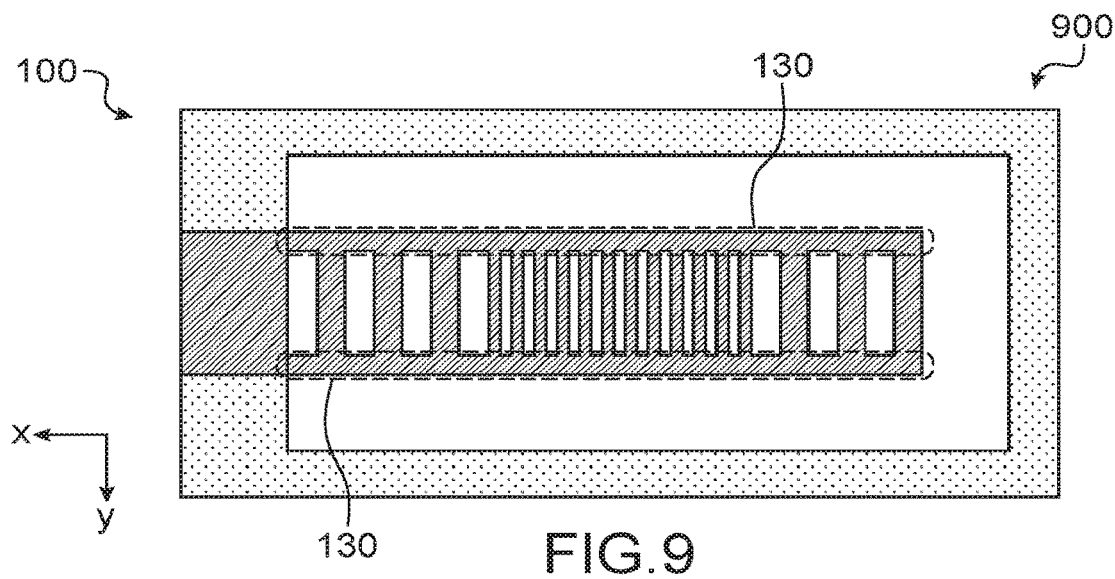

In the examples described hereinabove, the suspended arrangement is produced via at least one deformable mechanical element, fixed to the substrate by the two ends thereof along the axis (Ox) (axis of elongation of the waveguide when at rest). The suspended elements thus mechanically behave as a fixed-fixed beam of reduced mass. Alternatively, the at least one deformable mechanical element is only fixed to the substrate by one of the two ends thereof along the axis (Ox). In such a case, the injection and extraction of a light beam into and out of the opto-mechanical resonator take place on the same side of the waveguide. One example of such an alternative is shown in FIG. 9. The opto-mechanical resonator 900 in FIG. 9 only differs from that in FIG. 1A to 1C in that the support arms 130 are arranged such that they are fixed relative to the substrate on only one side along the axis (Ox). The mechanical behaviour of the suspended elements is thus that of a beam anchored at a single end.

Figure 10:
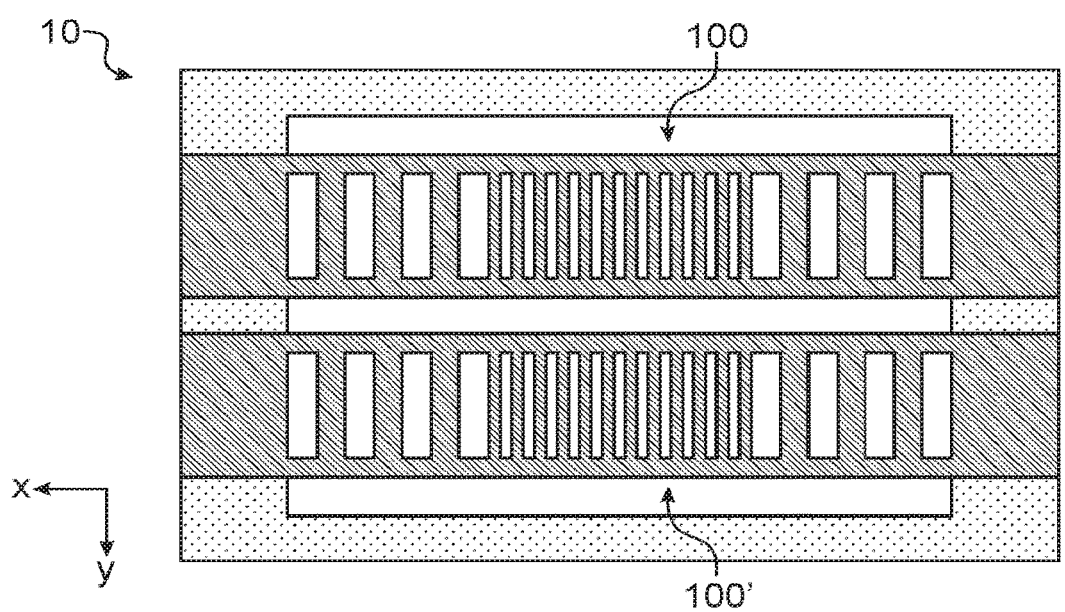
FIG. 10 diagrammatically shows a system according to the invention, including two optically-coupled opto-mechanical resonators, at least one whereof is an opto-mechanical resonator according to the invention.

FIG. 10 diagrammatically shows, by way of an overhead view, a system 10 comprising two opto-mechanical resonators according to the invention 100, 100'.

The two opto-mechanical resonators 100, 100' are two resonators of the type shown in FIG. 1A to 1C, which share the same substrate. When at rest, the subwavelength waveguides of the two resonators both extend parallel to the axis (Ox), in the same plane (xOy) parallel to the plane of the substrate.

The two resonators 100, 100' are arranged sufficiently close to one another to allow for evanescent optical coupling therebetween, at the respective waveguides thereof, between the respective Bragg mirrors thereof. The evanescent optical coupling directly depends on the distance separating the two waveguides. Thus, the setting of the waveguides in motion modifies the coupling rate associated with this evanescent coupling, which further amplifies the effect of a mechanical displacement on an optical signal circulating in either of said resonators.

In other alternative embodiments, only one of the resonators is a resonator according to the invention, whereby the other resonator only differs from the resonator according to the invention in that neither the waveguide nor the Bragg mirrors are arranged such that they are suspended. According to yet other alternative embodiments, the two resonators are arranged in different planes, each being parallel to the plane of the substrate, for example one above the other along the axis (Oz).

The opto-mechanical resonator according to the invention is advantageously produced using conventional silicon photonics technologies, for example from a wafer of the silicon-on-insulator type. The wafer is formed by a lower substrate (generally made of silicon), covered by a thick oxide layer (for example by 2 µm of $SiO_2$), which is itself covered by an upper layer of silicon (that is, for example, 220 nm thick).

The waveguide, the Bragg mirrors and the support arms are produced by locally etching the upper silicon layer over the entire thickness thereof. The etching uses, for example, a hard mask which is removed after etching.

The suspended arrangement of the waveguide and of the Bragg mirrors by way of the support arms is produced, by local etching in the thick oxide layer, over only part of the thickness thereof (for example hydrofluoric acid etching).

The invention is not limited to the examples described hereinabove. In particular, the different alternatives, embodiments, systems and devices described hereinabove can be combined with one another while still remaining within the scope of the invention.

Moreover, other alternatives can be implemented while still remaining within the scope of the invention, for example with Bragg mirrors comprising a material that is different from that of the first strips of the waveguide, or with mirrors that are instead formed by a metal coating, or with a cavity in the shape of a triangle or other polygon, etc. Similarly, the suspended arrangement can be produced by any number of support arms (or series of segments) that may or may not be centred on the waveguide. Silicon has been cited as an example for the material of the waveguide, however any other material capable of forming the core of an optical waveguide can also be used (SiN, GaS, Ge, etc.).

The opto-mechanical resonator according to the invention can be integrated into a photon circuit. In any case, it procures all of the advantages linked to integrated optics: mass production, low cost, simplified experimental operation, directly embedded system, and ability to operate in an all-optical manner.

In one similar embodiment of the invention, the at least one deformable mechanical element is formed by a single, wide support arm and passes via the middle of the first strips of the waveguide. The support arm thus forms the core of the waveguide, whereas the strips and the surrounding medium form the cladding of the waveguide.

The invention claimed is:

1. An opto-mechanical resonator comprising a waveguide formed by a plurality of first strips spaced apart from one another, wherein:
    the opto-mechanical resonator comprises at least two mirrors disposed facing one another, which mirrors are optically reflective over at least part of a guide wavelength range of the waveguide;
    the waveguide extends between the two mirrors, and forms therewith an optically resonant cavity; and
    a suspended region, comprising at least part of the waveguide, is held such that it is suspended over a substrate by at least one deformable mechanical element, and
    when undergoing deformation by way of the deformable mechanical element, the suspended region does not comprise a straight line but a curved line instead, resulting in a variation of the resonant wavelength of the opto-mechanical resonator.

2. The opto-mechanical resonator according to claim 1, wherein the deformable mechanical element is fixed relative to the substrate, at least at one of the ends thereof along an axis parallel to the waveguide.

3. The opto-mechanical resonator according to claim 1, wherein at least one deformable mechanical element comprises at least one arm, which extends along at least one axis parallel to the waveguide.

4. The opto-mechanical resonator according to claim 3, wherein at least one deformable mechanical element comprises two arms, laterally framing the suspended region.

5. The opto-mechanical resonator according to claim 3, wherein at least one deformable mechanical element comprises at least two series of segments, and wherein, in each series, the segments are distributed along an axis parallel to the waveguide and separated, in pairs, at least by a gap filled with a gas or a vacuum.

6. The opto-mechanical resonator according to claim 3, wherein at least one deformable mechanical element comprises a deformable membrane, forming a support for the suspended region.

7. The opto-mechanical resonator according to claim 1, wherein said mirrors are Bragg mirrors.

8. The opto-mechanical resonator according to claim 7, wherein each of said Bragg mirrors comprises a plurality of second strips, each of which is made of the same material as the first strips of the waveguide.

9. The opto-mechanical resonator according to claim 7, wherein at least part of at least one of said Bragg mirrors forms a part of the suspended region.

10. The opto-mechanical resonator according to claim 1, wherein the first strips of the waveguide are distributed one after another according to a distribution pitch $\Lambda$ such that:

$$\Lambda < \frac{\lambda_0}{2n_h}$$

where $\lambda_0$ is the central wavelength of the guide wavelength range of the waveguide; and $n_h$ is the average refractive index of the first strips.

11. A system comprising at least two opto-mechanical resonators, wherein:
    each opto-mechanical resonator comprises an optically resonant cavity, formed by a waveguide arranged between two mirrors, with the waveguide comprising a plurality of first strips spaced apart from one another;
    at least one of said opto-mechanical resonators forms an opto-mechanical resonator according to claim 1; and
    the opto-mechanical resonators are optically coupled in pairs by evanescent coupling.

12. A measuring device comprising at least one opto-mechanical resonator according to claim 1, and at least one optical sensor, the optical sensor being arranged so as to receive a light beam ($F_{out}$) emerging from the opto-mechanical resonator after having undergone a plurality of forward-return movements therein, and being capable of measuring a fluctuation, as a function of time, of a physical property of said light beam.

\* \* \* \* \*